United States Patent
Rezvani

(10) Patent No.: US 7,356,048 B1
(45) Date of Patent: Apr. 8, 2008

(54) METHOD AND APPARATUS FOR NETWORK MODEMS ON A SHARED COMMUNICATIONS CHANNEL

(75) Inventor: Behrooz Rezvani, San Ramon, CA (US)

(73) Assignee: Ikanos Communications, Inc., Fremont, CA (US)

( * ) Notice: Subject to any disclaimer, the term of this patent is extended or adjusted under 35 U.S.C. 154(b) by 258 days.

(21) Appl. No.: 11/008,432

(22) Filed: Dec. 8, 2004

Related U.S. Application Data

(60) Provisional application No. 60/528,132, filed on Dec. 8, 2003.

(51) Int. Cl.
*H04J 1/00* (2006.01)
(52) U.S. Cl. .................. 370/481; 370/487; 370/488
(58) Field of Classification Search ............. 370/480, 370/481, 485, 487, 488, 344; 375/222
See application file for complete search history.

(56) References Cited

U.S. PATENT DOCUMENTS

2002/0186715 A1* 12/2002 Mestdagh .................. 370/480
2002/0196732 A1* 12/2002 Mestdagh ............... 370/480 X

* cited by examiner

*Primary Examiner*—Philip J. Sobutka
(74) *Attorney, Agent, or Firm*—IP Creators; Charles C Cary

(57) ABSTRACT

A network modem which interfaces, in an embodiment of the invention, with existing wired media within a home. The network modems couple to an existing shared medium and utilize frequency division multiplexing to create a communication network thereon. Communication channels are established, discrete from one another in frequency space with each of the active modems coupled to the shared communications medium. Each communication channel carries simplex communications between two or more modems, and all simplex communication channels operate simultaneously to provide a network between all the active modems coupled to the shared communications medium.

2 Claims, 7 Drawing Sheets

Networked Modems

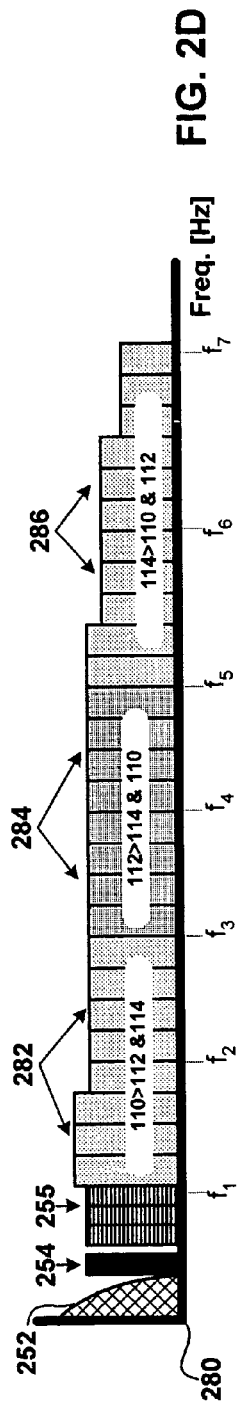
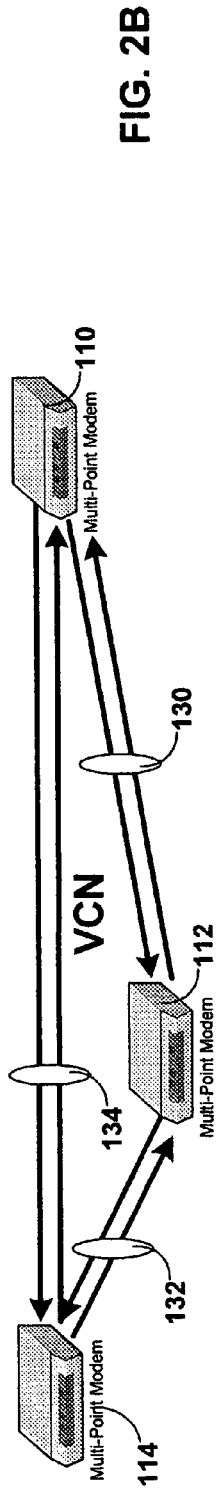
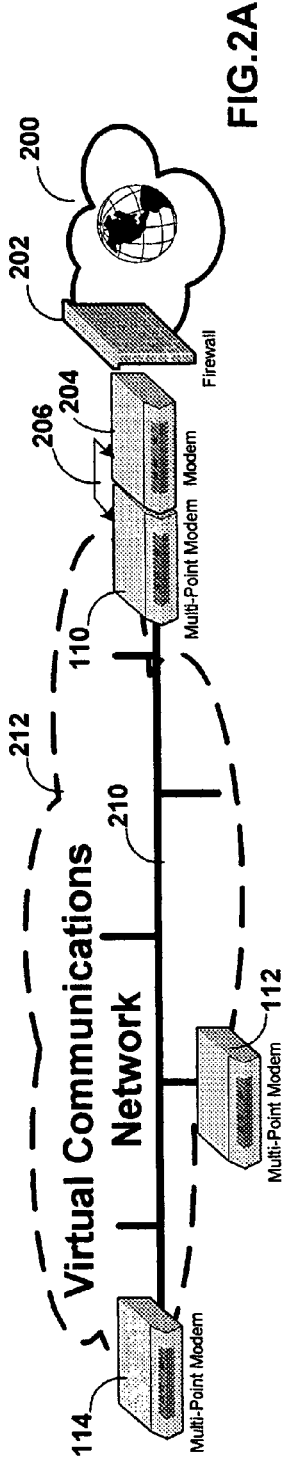

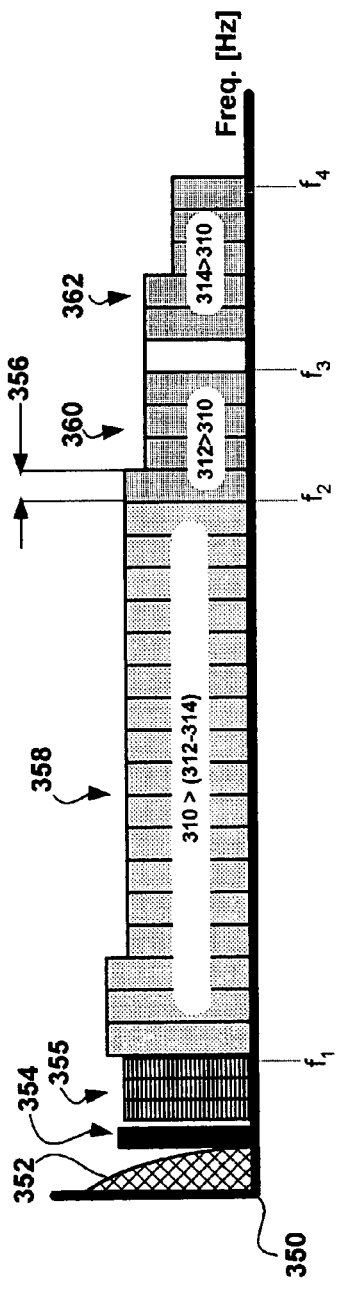
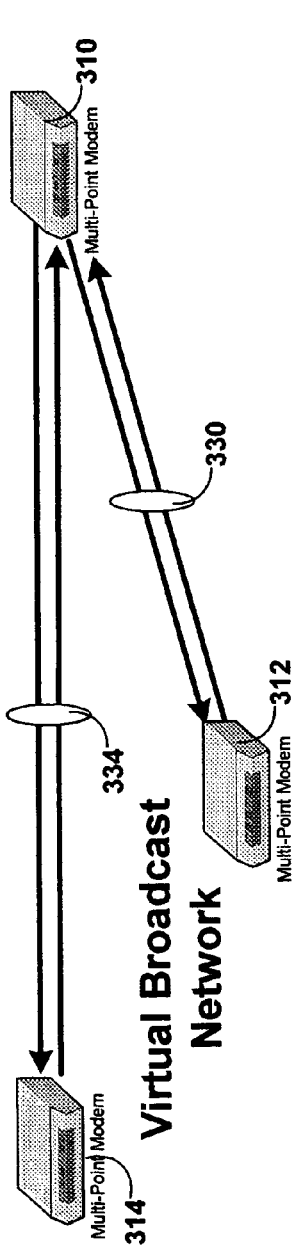
FIG. 3A
FIG. 3B
FIG. 3C

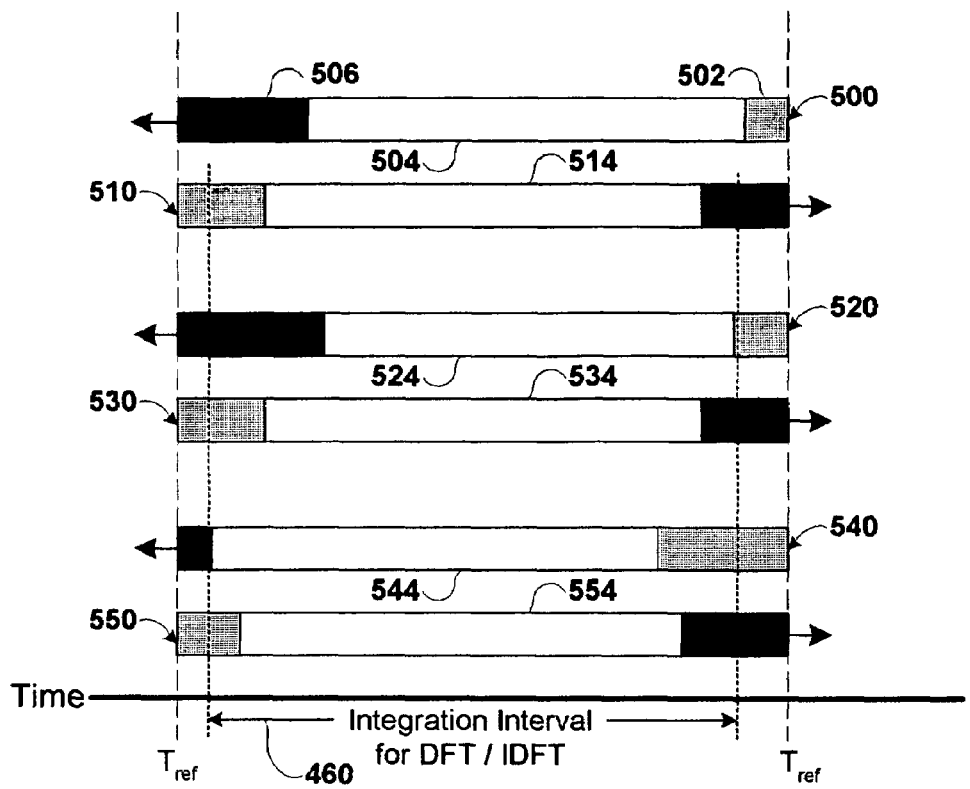
FDMA via Synchronization of FFT Integration Intervals  FIG. 5
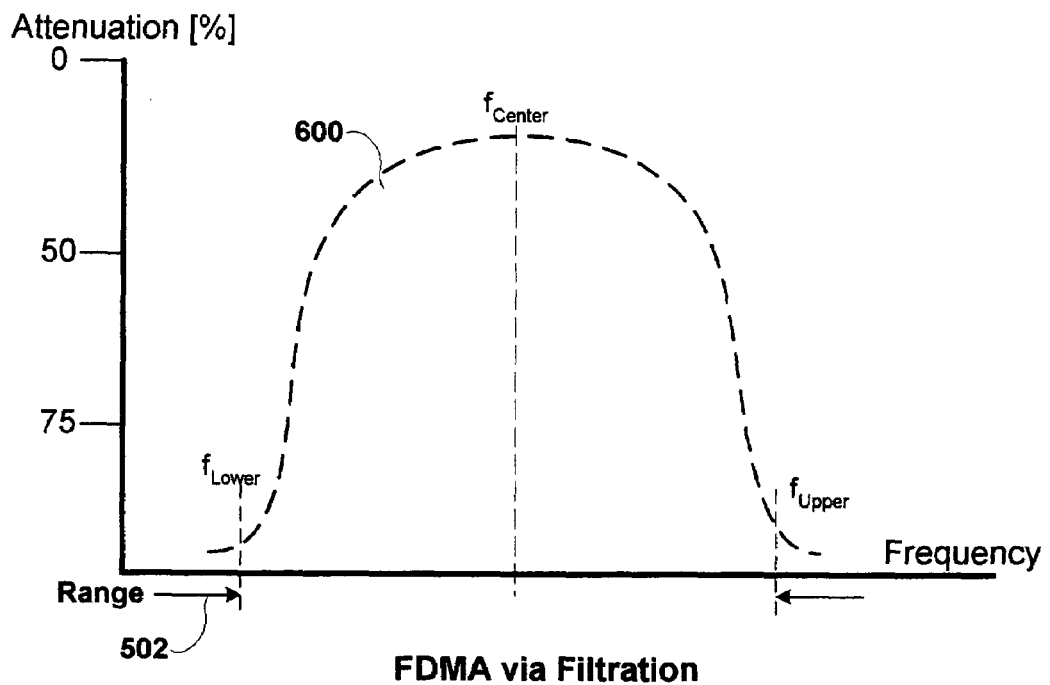
FDMA via Filtration
FIG. 6

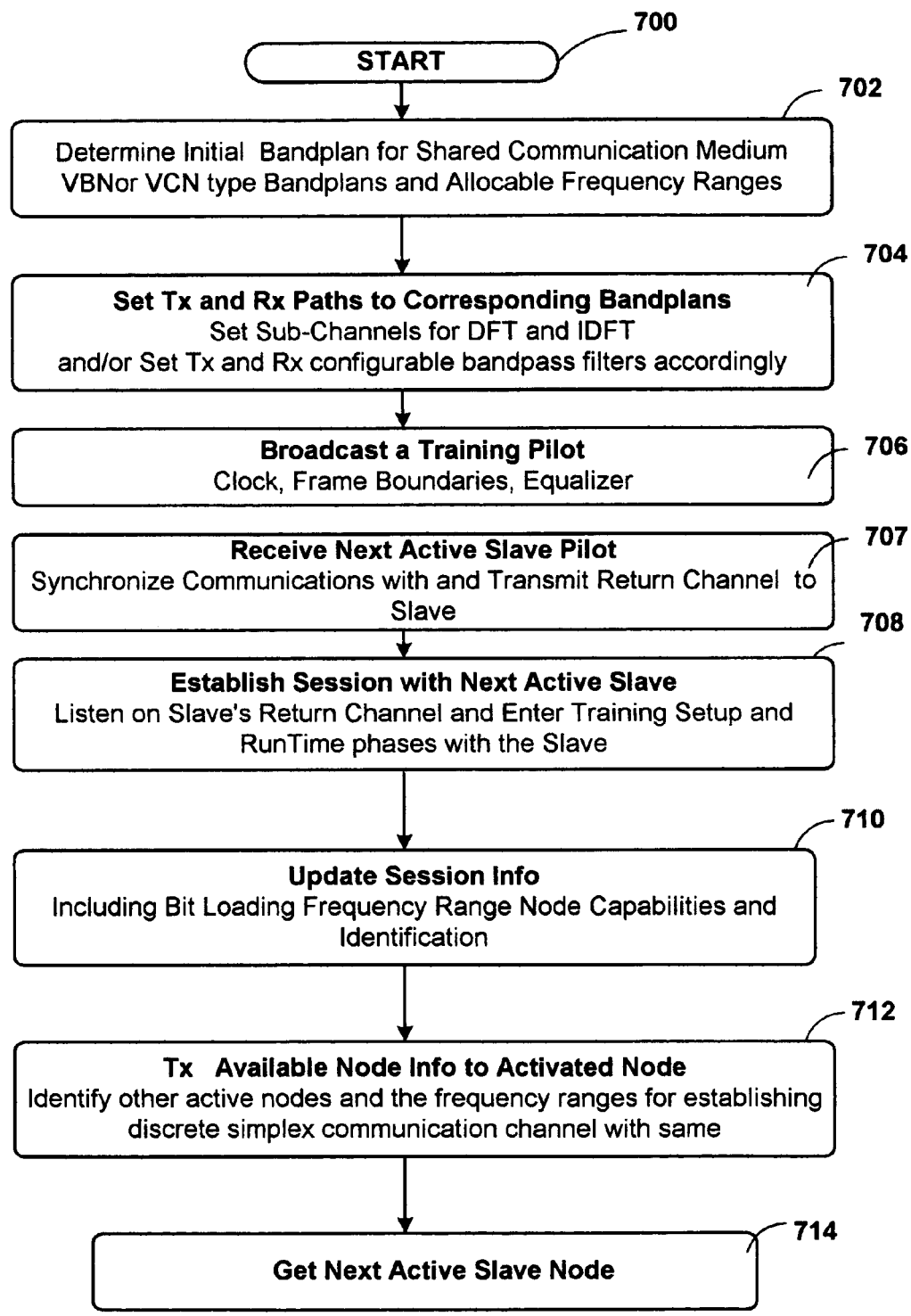
Master Modem  FIG. 7

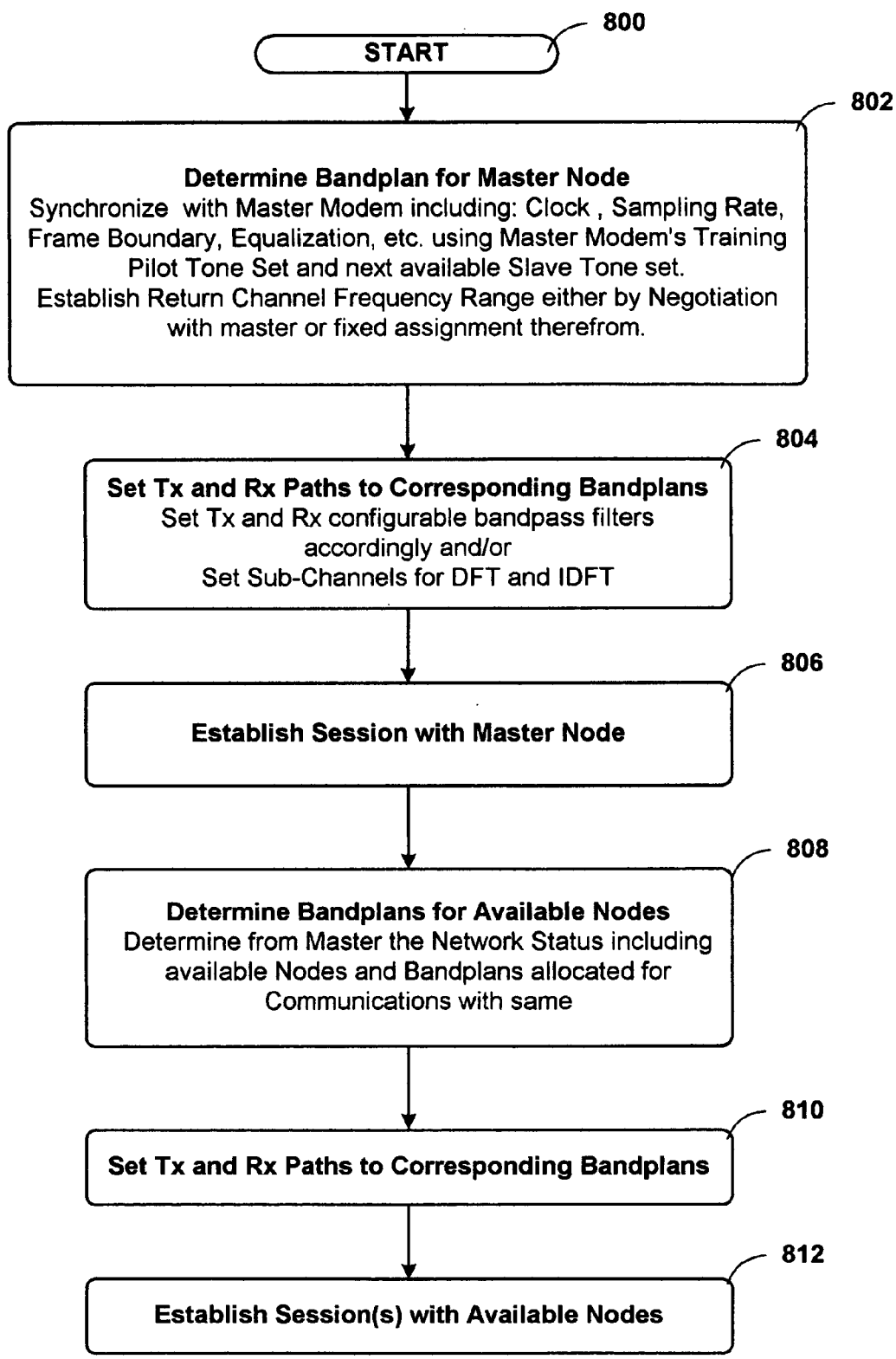
Slave Modem  FIG. 8

METHOD AND APPARATUS FOR NETWORK MODEMS ON A SHARED COMMUNICATIONS CHANNEL

CROSS REFERENCE TO RELATED APPLICATION

This application claims the benefit of prior filed co-pending Provisional Application No. 60/528,132 filed on Dec. 8, 2003 entitled "Method and Apparatus for DSL ready TV" which is incorporated herein by reference in its entirety as if fully set forth herein.

BACKGROUND OF THE INVENTION

1. Field of Invention

The present invention is generally related to modems, and more particularly to modem network.

2. Description of the Related Art

A range of technologies have been developed for providing broadband access to residential housing. These technologies include: passive optical network (PON), cable, satellite and digital subscriber line (DSL). Each technology relies on a different communications medium, either wired, wireless or fiber for the transport of data. Typically each of these technologies is used to provide broadband access up to but not within the home. Inside the home the broadband access will be distributed to one or more TV's, computers, or other devices by means of a wired or wireless connection. In the case of a wired router connections to each TV or computer are typically provided by Ethernet cables strung throughout the home, each connection individually. In the case of a wireless router connections are made through one or more base stations and receivers sharing air medium. Existing home distribution networks include: copper/aluminum wire for phone connections throughout the home, existing cable connections for cable TV in various rooms of the home, and existing copper/aluminum wire by which electricity is provided throughout all the rooms of the home.

For all intents and purposes the existing home wiring is not utilized both for forming a network within and for distributing broadband access throughout the home. Thus a typical broadband equipped home will have four or more redundant electrical connections to each room provided by the above mentioned media.

What is needed is a method and apparatus for improving the ease, security and coverage of broadband access provisioning to residential dwellings.

SUMMARY OF THE INVENTION

A method and apparatus for a network modem is disclosed. The network modem may be utilized in existing homes to interface with existing interconnected shared wired media within the home, e.g. cable, or copper/aluminum phone or power circuits and to form a network within the home. This avoids the coverage limitations, security issues, and expense of wireless home networks and avoids the costs of rewiring the home. In an embodiment of the invention network modems couple to an existing shared communications medium and utilize frequency division multiplexing to create simplex communication channels discrete from one another in frequency space with each of the active modems coupled to the shared communications medium. Each simplex communication channel carries simplex communications between two or more modems, and all simplex communication channels operate simultaneously to provide a network between all the active modems coupled to the shared communications medium.

In an embodiment of the invention a network modem configured to couple to modems across a shared communications medium is disclosed. The network modem includes: components coupled to one another to form a transmit path and a receive path, and a processor. The processor configures the transmit and receive path components to allocate at least two discrete portions of a frequency range supported by the shared communications medium for simultaneous communications with at least two of the modems, thereby networking the corresponding modems.

In an alternate embodiment of the invention a network comprising a shared wired communications medium and at least three modems coupled thereto is disclosed. The modems establish in concert a plurality of frequency division multiplexed simplex communication channels on the shared wired communications medium. At least one of the modems is configured to simultaneously communicate with at least two remaining ones of the modems over corresponding ones of the plurality of simplex communication channels, thereby networking the modems.

In an alternate embodiment of the invention a method is disclosed for networking modems on a shared communications medium.

BRIEF DESCRIPTION OF THE DRAWINGS

These and other features and advantages of the present invention will become more apparent to those skilled in the art from the following detailed description in conjunction with the appended drawings in which:

FIG. 2A is a physical network diagram showing an embodiment of a network formed by multi-point modems.

FIG. 2B is a logical network diagram showing the simplex communication channels between the multi-modems shown in FIG. 2A.

FIGS. 2C-D are graphs of alternate embodiments of frequency allocation on the shared communications medium to which the multi-point modems shown in FIG. 2A are coupled.

FIG. 3A is network diagram of another embodiment of a physical network formed by multi-point modems.

FIG. 3B is a logical network diagram showing the simplex communication channels between the multi-modems in the embodiment shown in FIG. 3A.

FIG. 3C is a graph of frequency allocation on the shared communications medium to which the multi-point modems shown in FIG. 3A are coupled.

FIG. 5 is a graph of the integration intervals for Fourier Transforms performed by an embodiment of the multi-modem shown in FIG. 4.

FIG. 6 is a graph of filter characteristics for an embodiment of the configurable filters in the multi-point modem of FIG. 4.

FIG. 7 is a process flow diagram for an embodiment of the invention in which a master multi-point modem manages network setup.

FIG. 8 is a process flow diagram for the embodiment of the invention shown in FIG. 7 showing the processes performed by a slave multi-point modem.

DETAILED DESCRIPTION OF THE EMBODIMENTS

A network modem is disclosed which utilizes a shared communications medium including in an embodiment of the invention existing home electrical wiring, phone wiring or optical cable for the formation of a network within the home. Each modem may include an Ethernet interface for coupling to a computer, TV or other device or appliance. The modems are identified as multi-point in that they possess the ability to communicate with more than one point, i.e. other modem, over a single shared communications medium by means of frequency division multiplexing (FDMA). The network formed between modems over the shared communications medium is said to be virtual in that the aggregate of all discrete links between modems forms either a virtual communications network VCN in which each modem is able to communicate directly and simultaneously with any other modem, or a virtual broadcast network in which at least one modem is able to communicate directly and simultaneously with any other modem, in either case over a shared communications medium.

In each of the Figures the reference numbers for elements introduced in each Figure correspond with the number of the Figure. For example elements referenced in FIG. 1 have reference numbers between 100-199. Elements referenced in FIG. 2 have reference numbers between 200-299, and so forth. For purposes of clarity elements first referenced in an earlier Figure may again appear in a subsequent figure.

Figure 1:
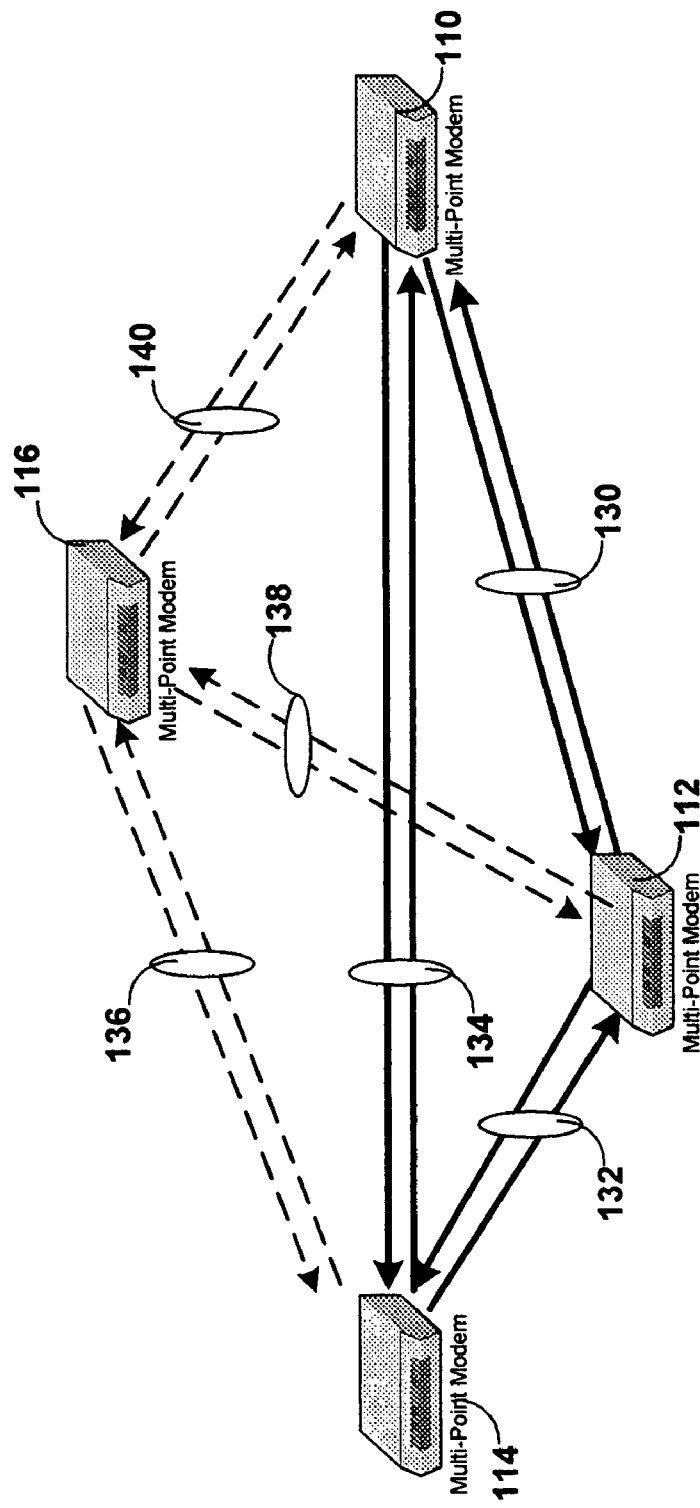
FIG. 1 is a logical network diagram showing the links forming a network of multipoint modems.

FIG. 1 is a logical network diagram showing for an embodiment of the invention, the links required to form a virtual communications network (VCN) from the multi-point modems. Four modems 110-116 are shown coupled to one another via six pairs 130-140 of simplex communication channels. These channels are formed by frequency division multiplexing on a shared communications medium to which all modems are coupled. The shared communications medium may include, a subscriber line coupling a central office and a home or within a home the existing phone, power or cable wiring. In the embodiment shown a pair of simplex communication channels link each pair of modems. One channel of the pair handles transmissions from one of the modems to the other and vice-versa. As each new modem is added to the network the number of simplex communications channels increases proportionately to $$\frac{N!}{(N-2)!}$$

where N is the number of modems. In alternate network topologies such as the broadcast topology shown in FIGS. 3A-C fewer simplex communication channels are required to form a network. In a switched network the number of communications channels, i.e. wire connection is equal to the number of users plus a central node.

FIG. 2A is a physical network diagram showing an embodiment of the network formed by multi-point modems shown in FIG. 1. Multi-point modems 110-114 are shown coupled over a shared communications medium 210 to one another to form a virtual communications network VCN 212. The shared communications medium in this embodiment may comprise the existing optical cable, electrical or phone wiring in a residential structure. Access to the Internet 200 is provided through a firewall 202 by a prior art DSL or Cable modem 204 coupled via an Ethernet port connection 206 to one of the multi-point modems 110.

FIG. 2B is a logical network diagram showing the simplex communication channels between the multi-modems 110-114 shown in FIG. 2A. As discussed above in FIG. 1 the number of simplex communication channels increases proportionately to $$\frac{N!}{(N-2)!}$$

where N is the number of multi-point modems. Three pairs 130-134 of simplex communication channels are shown. Each pair provides a simplex transmission channel from one of the modems to the other and vice-versa. Any number of multi-point modems may be coupled to each other over the network subject to the bandwidth constraints of the shared communications medium.

FIG. 2C is a graph 250 of frequency allocation on the shared communications medium to which the multi-point modems shown in FIG. 2A are coupled. FDMA allows multiple simplex communications channels to be formed in discrete portions of the frequency range available on the communications medium. In the embodiment shown voice band public switched telephone line (PSTN) communications consistent for example with an existing household phone line are shown occupying the lowest portion 252 of the frequency range. In the embodiment shown each multi-point modem modulates the corresponding portions of the shared communications medium with a common multi-tone modulation protocol such as the digital multi-tone (DMT) protocol used for existing digital subscriber line (DSL) modems worldwide. Each tone corresponds to a sub-channel. Each sub-channel has a center frequency about which quadrature phase amplitude modulation (QPAM) is used to carry information across each sub channel. Typically each sub-channel spans a 4.125 KHz frequency range. In alternate embodiments of the invention the sub-channel frequency range 256 may take on other values. The first simplex communication channel 260 in the embodiment shown includes four sub-channels, a.k.a. tones spanning frequency range $f_1$-$f_2$ and handles communications from multi-point modem 110 to multi-point modem 112. The second simplex communication channel 262 also includes four sub-channels spanning frequency range $f_2$-$f_3$ and handles communications from multi-point modem 112 to multi-point modem 110. Collectively this pair of simplex communications channels corresponds with the pair 130 shown in FIG. 2B.

The third and fourth simplex communication channels 264-266 each also include four sub-channels spanning frequency ranges $f_3$-$f_4$ and $f_4$-$f_5$ respectively and handle communications to and from multi-point modems 112 and 114 respectively. Collectively this pair of simplex communications channels corresponds with the pair 132 shown in FIG. 2B.

The fifth and sixth simplex communication channels 268-270 each include more than four sub-channels spanning frequency ranges $f_5$-$f_6$ and $f_6$-$f_7$ respectively due to the decrease in information carrying capability at higher frequencies. These simplex communications channels handle communications to and from multi-point modems 114 and 110 respectively. Collectively this pair of simplex communications channels corresponds with the pair 134 shown in FIG. 2B. In alternate embodiments of the invention a simplex communication channel may comprise non-contiguous portions of the frequency range available on the shared communications medium. For example the sub-channels referenced as 272 may be added to any of the simplex communications channels discussed above either on a dynamic basis as demanded by capacity requirements or statically at time of setup.

The number of tones per simplex communication channel is for illustrative purposes only and would typically be significantly greater than discussed above.

As also shown in FIG. 2C and as consistent with the embodiment of the invention shown in FIGS. 7 and 8, the spectral allocation on the shared communications medium may also include a first set of one or more pilot tone sets 254 occupying their own fixed discrete frequency range(s) the locations of which are pre-programmed into or known to all multi-point modems. This first set of pilot tones as discussed in FIGS. 7-8 and the accompanying description may be utilized by a master one of the multi-point modems to handle network setup and bandwidth allocation between remaining modems operating as slaves with respect to the master. A corresponding second set of tones 255 is available to each slave on a first come first serve basis, one set of tones within the second set for each slave to conduct communications with the master both during the setup and runtime phases of a session. Each slave has its own set of these tones identified as slave tone sets. In an embodiment of the invention a slave's tone set may fall within or alternately outside of the broader return path and associated tones which the master assigns to the slave.

FIG. 2D is a graph 280 of an alternate embodiment for frequency allocation on the shared communications medium to which the multi-point modems shown in FIG. 2A are coupled. The first simplex communication channel 282 in the embodiment shown includes eight sub-channels, a.k.a. tones spanning frequency range $f_1$-$f_3$ and handles communications from multi-point modem 110 to either or both multi-point modems 112-114. The second simplex communication channel 284 also includes eight sub-channels spanning frequency range $f_3$-$f_5$ and handles communications from multi-point modem 112 to either or both multi-point modems 110 and 114. The third simplex communication channel 286 includes eleven sub-channels spanning frequency range $f_5$-$f_7$ and handles communications from multi-point modem 114 to either or both multi-point modems 110 and 112. In this embodiment of the invention the number of simplex channels corresponds to N the number of modems. Each modem has its own discrete portion of the band plan for transmission and no modem has a discrete portion for reception. Reception is handled at higher layers in the modem stack. For example, both modems 112 and 114 would receive from modem 110 over the simplex communication channel 282 spanning frequency range $f_1$-$f_3$. Higher layer applications in either modem 112-114 would parse out from modem 110's transmissions only their own corresponding communications. Similarly, modems 114 and 110 would receive from modem 112 over the simplex communication channel 284 spanning frequency range $f_3$-$f_5$ Similarly also, both modems 110 and 112 would receive from modem 114 over the simplex communication channel 286 spanning frequency range $f_5$-$f_7$.

FIG. 3A is network diagram of another embodiment of a physical network formed by multi-point modems. In this embodiment of the invention fewer simplex communication channels are required to form the virtual broadcast network (VBN) than were required in the VCN embodiment of FIGS. 1 and 2A-C. In this embodiment of the invention only one multi-point modem communicates with all the modems to form a virtual broadcast network. This topology is suitable for the distribution of content such as television or other multi-media. The broadcasting multi-point modem 310 is shown coupled to a single subscriber line 300 which is the shared communications medium. Via splices or taps 304-306 the single subscriber line couples to two or more modems. Multi-point modem 314 is shown coupled through tap 304 and subscriber line 300 to multi-point modem 310. Multi-point modem 312 is shown coupled through tap 306 and subscriber line 300 to multi-point modem 310. Each multi-point modem includes an Ethernet or TV interface for delivering the broadcast content to corresponding one of televisions 308-310. The televisions may be located in the same or different homes.

FIG. 3B is a logical network diagram showing the simplex communication channels between the multi-modems in the embodiment shown in FIG. 3A. A first pair of simplex communication channels 334 links the broadcasting multi-point modem 310 to the receiving multi-point modem 314. A second pair of simplex communication channels 330 links the broadcasting multi-point modem 310 to the receiving multi-point modem 312. In this embodiment of the invention no simplex communication channels directly link modems 312 and 314. Additionally, in this embodiment of the invention a broadcast one of the simplex communications channels is common to each pair 330, 334. Thus number of simplex communication channels increases required to form a virtual broadcast network topology is 2(N−1) where N is the number of multi-point modems one of which handles the broadcast of data. Any number of multi-point modems may be coupled to the broadcast network.

FIG. 3C is a graph 350 of frequency allocation on the shared communications medium to which the multi-point modems shown in FIG. 3A are coupled. FDMA allows a broadcast simplex communication channel and two or more simplex return path communication channels to be formed in discrete portions of the frequency range available on the communications medium. In the embodiment shown voice band public switched telephone line (PSTN) communications consistent for example with an existing household phone line are shown occupying the lowest portion 352 of the frequency range. In the embodiment shown each multi-point modem modulates the corresponding portions of the shared communications medium with a common multi-tone modulation protocol such as the DMT. The first simplex communication channel 358 is the broadcast channel which in the example shown includes seventeen sub-channels, a.k.a. tones spanning frequency range $f_1$-$f_2$ and handles broadcast communications from multi-point modem 310 to multi-point modems 312 and 314. The broadcast channel may handle one or more simultaneous broadcast feeds. The second simplex communication channel 360 includes four sub-channels spanning frequency range $f_2$-$f_3$ and handles return path communications from multi-point modem 312 to multi-point modem 310. Collectively the pair of simplex communications channels 358-360 corresponds with the pair 330 shown in FIG. 3B. The third simplex communication channels 362 also includes four sub-channels spanning frequency range $f_3$-$f_4$ and handles return path communications from multi-point modem 314 to broadcasting multi-point modem 310. Collectively the pair of simplex communications channels 358, 362 corresponds with the pair 334 shown in FIG. 3B. Where the broadcast simplex communication channel includes a plurality of simultaneous content feeds the return channel may be used by each corresponding multi-point modem to select a desired one among the content feeds.

In alternate embodiments of the invention a simplex communication channel may comprise non-contiguous portions of the frequency range available on the shared communications medium.

The number of tones per simplex communication channel is for illustrative purposes only and would typically be significantly greater than discussed above.

As also shown in FIG. 3C and as consistent with the embodiment of the invention shown in FIGS. 7 and 8, the spectral allocation on the shared communications medium may also include one the first and second set of tones 354-355 occupying their own fixed discrete frequency range(s) for use by the master and slaves respectively as discussed above in connection with FIG. 2C.

Figure 4:
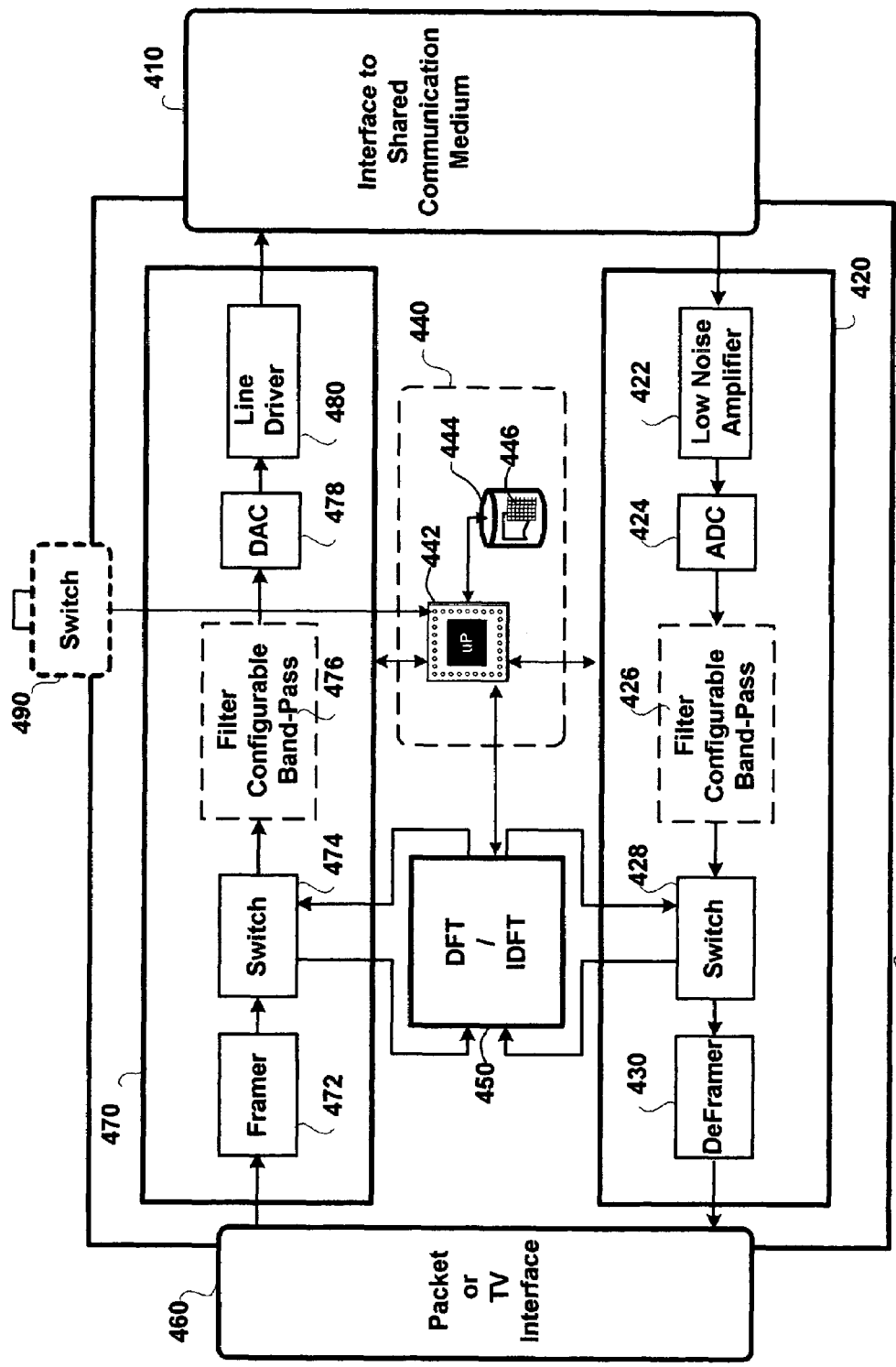
FIG. 4 is a hardware block diagram of an embodiment of the multi-point modem.

FIG. 4 is a hardware block diagram of an embodiment of the multi-point modem 400. Throughout the specification, drawings and claims the phrases multi-point modem and network modem are synonymous with respect to one another. The multi-point modem 400 includes both shared and discrete components coupled to one another to form a transmit path 470 and a receive path 420. The transmit and receive path couple on one end to the shared communications medium via interface 410, and on the other end to an Ethernet or other packet based network or appliance or to a Television or other mixed or multi-media device via interface 460. The transmit and receive path operate under the control of a processor 440. The processor handles the determination of and subsequent configuration of the transmit and paths to support the desired FDMA allocation of simplex communication channels for each modem. Such allocation may be pre-programmed into each multi-point modem, or may be user selected via a switch 490 or other manual method of selection, or via setup communications between a master one of the modems and slave ones of the modems as shown and discussed in the following FIGS. 7-8. The processor includes a micro-controller 442, memory 444 and associated program code and lookup tables 446.

The dedicated components of this embodiment of the transmit path include a framer 472, a switch 474, an optional and a configurable band-pass filter 476, a digital to analog (DAC) converter 478 and a line driver 480. The dedicated components of this embodiment of the receive path include a low noise amplifier 422, an analog to digital (ADC) converter 424, an optional and a configurable band-pass filter 426, a switch 428 and a deFramer 430.

In this embodiment a Fourier transform processor 450 component is shared between the transmit and receive path for performing a corresponding one of an inverse discrete Fourier transforms (IDFT) and discrete Fourier transform (DFT). In an alternate embodiment of the invention a dedicated IDFT and DFT would be provided for a corresponding one of the transmit and receive path.

In an embodiment of the invention FDMA of the simplex communication channels across all multi-point modems is accomplished without a requirement of the configurable band pass filters. This is accomplished when all multi-point modems are synchronized to a master modem and share common synchronous integration intervals therefore (See FIG. 5). This obviates the need for band pass filters. In an embodiment of the invention where the requisite synchronization is not achieved configurable band pass filters may be used to establish the requisite center frequencies on the transmit and receive path for each of the simplex communication channels allocated thereto.

FIG. 5 is a graph of the integration intervals for Fourier Transforms performed by an embodiment of the multi-modem shown in FIG. 4. In this embodiment of the invention the symbol frames 500, 510 associated with a first pair 130 (See FIG. 2B) of simplex communication channels, the symbol frames 520, 530 associated with a second pair 132 (See FIG. 2B) of simplex communication channels and the symbol frames 540, 550 associated with a third pair 134 (See FIG. 2B) of simplex communication channels, are shown. Each includes a cyclic prefix and suffix. The cyclic prefix 506, and cyclic suffix 502 for simplex communication channel 500 are shown in relation to the payload 504 of that channel. The payloads 514, 524, 534, 544 and 554 for simplex communication channels 510, 520, 530, 540 and 550 respectively are also shown. Each of the Fourier transform processors in each of the three multi-point modems 110-114 forming the resultant VCN (See FIGS. 2A-C) are all, in this embodiment of the invention, substantially synchronized with one another. All share a common integration interval 460 during which the corresponding DFTs and IDFTs are performed. Where this level of synchronization of clocks and integration intervals is achieved by all multi-point modems in the virtual network, the configurable band pass filters shown in FIG. 4 are not required to separate the simplex communication channels from one another and thereby form the VCN.

FIG. 6 is a graph of filter characteristics for an embodiment of the configurable filters in the multi-point modem of FIG. 4. Configurable band pass filters may be utilized in embodiments of the invention in which the requisite synchronization of the multi-point modems shown in FIG. 5 is not desirable. In this embodiment of the invention configurable band pass filters 426, 476 may be used to form a number of pass bands, e.g. pass band 600, on the transmit and/or receive path to conform with the frequency ranges for the corresponding ones of the simplex communication channels handled by each corresponding multi-point modem. Typically either or both the transmit or receive path would have more than one pass band each with its own discrete center frequency and all non-overlapping with one another.

FIG. 7 is a process flow diagram for an embodiment of the invention in which a master multi-point modem manages network setup. FIG. 7 shows the processes performed by the designated master one of the multi-point modems. After initialization in start block 700 control passes to process 702. In process 702 the master modem determines an initial band plan for the shared communications medium. This band plan may establish one or more of the initial FDMA simplex communication channel assignments for either the VBN or VCN type network topologies. Next in process 704 the master multi-point modem sets up its own transmit and receive paths to support the corresponding FDMA band plan. Setup may include configuration of pass band filters for the first and subsequent simplex communication channels which the master multi-point modem will support and the associated assignment of DMT sub-channels in the Fourier transform processor to each simplex communication channel.

Next in process 706 the master broadcasts a training pilot tone set of one or more tones or sub-channels on a pre-defined frequency range accessible during network setup by all the multi-point modems on the network. Next in process 707 the master identifies the next active slave pilot tone set and synchronizes clock, frame set, equalizer, integration intervals, and other setup parameters with the corresponding slave. Over the first (master) and second (slave) tone sets the master also assigns a return path frequency range to the slave. This latter assignment may be made on the basis of a pre-defined fixed band plan or on the basis of a request from the slave for a fixed amount of bandwidth and an intelligent allocation in response to the slave's request of all or part of the requested bandwidth based on availability and other network factors known to the master and identified by the slave. As the network is being formed these initial communications may also convey additional information such as active multi-point modems and their corresponding FDMA assignments. Next in process 708 the master multi-point modem establishes an active session with the next active node on the d return and outgoing simplex communication channels identified in processes 706-707. After the session is established the master multi-point modem updates in process 710 its session information with the bit loading, and node identification for the corresponding multi-point modem with which the session was established in process 708. The master multi-point modem then in process 712 transmits on the designated simplex communication channel the updated network information to the multi-point modem activated in process 708. This information identifies simplex communication channel assignments and other required parameters sufficient to allow, in an embodiment of the invention, the 'slave' modems to directly establish simplex communication links with one another on the FDMA band plan assignments received from the master one of the multi-point modems. Next in process 714 control returns to process 707 for the setup of the next available multi-point modem network node.

In an embodiment of the invention the master modem continues to transmit the training pilot even after setup of the complete network, to handle such tasks as dynamic k reconfiguration of FDMA simplex communication channel assignments to conform with changing bandwidth requirements from one or more of the multi-point modems.

FIG. 8 is a process flow diagram for the embodiment of the invention shown in FIG. 7 showing the processes performed by a slave multi-point modem. After initialization in block 800 processes 802 are commenced. In process 802 the slave multi-point modem demodulates the information on the training pilot of the master multi-point modem and uses the next available slave tone set to conduct limited communications with the master sufficient to synchronize the slave's clock, sampling, frame boundaries, equalizers, integration intervals etc. with the master. Additionally the slave and master either negotiate or the master simply sets without negotiation a simplex outgoing and return path communication channels between the master and the slave multi-point modem. Next in process 804 the slave multi-point modem's processor configures the transmit and receive path components to conform with the designated outgoing and return path simplex communication channel frequency range assignments. This may be accomplished via configurable band pass filters on the transmit and receive paths or by the requisite sychronization of the Fourier transform processor integration intervals with the other multi-point modems on the network. The corresponding sub-channel assignments are made for outgoing and return path simplex communication channels in the slave multi-point modem's DFT and IDFT processor(s). Next in process 806 the slave multi-point modem established communications with the master multi-point modem on the designated simplex communication channels.

Once communications between the slave multi-point modem and the master are established the slave may, in an embodiment of the invention, obtain from the master on the master-slave simplex communication channel the frequency assignments for the other available slave multi-point modems which form the network. Then in process 810 the slave multi-point modem adds these frequency range assignments to its existing transmit and return path channel assignments and in process 812 the slave multi-point modem sets up communications with each other available slave independent of the master multi-point modem.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A method of networking modems on a shared communications medium, comprising:

coupling an integer N modems to the shared communications medium;

allocating on a master one of the N modems discrete portions of an overall frequency range supported by the shared communications medium for discrete simplex communication channels between each of the N modems coupled in the coupling act;

broadcasting information identifying the discrete portions of the overall frequency range allocated in the allocating act from the master one of the N modems to remaining slave ones of the modems, over a pilot channel reserved for the master one of the modems; and establishing simultaneous communications between at least two of the remaining slave ones of the modems and the master one of the modems over corresponding discrete portions of the overall frequency range identified by the master modem in the pilot channel broadcast in the broadcasting act;

sending simplex communication channel assignments for slave-to-slave simplex communication links from the master one of the modems to selected ones of the slave modems; and establishing direct simultaneous communications between at least two of the remaining slave ones of the modems responsive to the sending act, thereby enabling a network which supports both master-to-slave together with slave-to-slave communications.

2. A network comprising:

a shared wired communications medium;

a plurality of modems including:

a master one of the plurality of modems configured to allocate discrete portions of an overall frequency range supported by the shared wired communications medium for discrete simplex communication channels between each of the N modems and to communicate frequency allocations to remaining slave ones of modems including frequency allocations for slave-to-slave communications; and the remaining slave ones of the plurality of modems configured to initiate communications with both the master one as well as selected slave ones of the plurality of modems on simplex communications channels in the discrete portions of the overall frequency range allocated by the master one of the plurality of modems, thereby enabling a network which supports both master-to-slave together with slave-to-slave communications.

\* \* \* \* \*